(12) United States Patent
Gundavelli et al.

(10) Patent No.: US 12,418,832 B2
(45) Date of Patent: *Sep. 16, 2025

(54) MIGRATION OF NETWORK TRAFFIC BETWEEN LICENSED AND UNLICENSED SPECTRUM

(71) Applicant: Cisco Technology, Inc., San Jose, CA (US)

(72) Inventors: Sri Gundavelli, San Jose, CA (US); Vimal Srivastava, Bangalore (IN)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/769,624

(22) Filed: Jul. 11, 2024

(65) Prior Publication Data
US 2024/0365173 A1    Oct. 31, 2024

Related U.S. Application Data

(63) Continuation of application No. 17/857,550, filed on Jul. 5, 2022, now Pat. No. 12,058,567.

(51) Int. Cl.
*H04W 28/086* (2023.01)
*H04W 28/08* (2023.01)

(52) U.S. Cl.
CPC ... *H04W 28/0865* (2023.05); *H04W 28/0942* (2020.05)

(58) Field of Classification Search
CPC ......... H04W 28/0865; H04W 28/0883; H04W 28/0892; H04W 28/09; H04W 28/0908; H04W 28/0917; H04W 28/0925; H04W 28/0933; H04W 28/0942; H04W 28/095; H04W 28/0958; H04W 28/0967; H04W 28/0975; H04W 28/0983; H04W 28/0992; H04W 28/10; H04W 28/12; H04W 40/04;
(Continued)

(56) References Cited

U.S. PATENT DOCUMENTS 8,547,862 B2    10/2013    Bahl et al.
8,705,398 B2    4/2014    Koskela et al.
(Continued)

FOREIGN PATENT DOCUMENTS

WO    2017024659 A1    2/2017

*Primary Examiner* — Charles C Jiang
*Assistant Examiner* — Rachel Elizabeth Marks
(74) *Attorney, Agent, or Firm* — Polsinelli P.C.

(57) ABSTRACT

The present disclosure is directed to migrating network traffic from a licensed spectrum to an unlicensed spectrum within the same radio access technology (RAT). In one aspect, a method includes identifying a user device connected to a cellular wireless access technology, over a licensed spectrum; determining whether a condition for switching network traffic associated with the user device to an unlicensed spectrum is triggered; in response to determining that the condition is triggered, determining an unlicensed spectrum to move the network traffic to, the unlicensed spectrum being within a same cell as the licensed spectrum or in a different cell compared to a cell in which the licensed spectrum is; and migrating at least a portion of the network traffic to the unlicensed spectrum while maintaining network connectivity of the user device over the cellular wireless access technology.

20 Claims, 14 Drawing Sheets

(58) Field of Classification Search
CPC ..... H04W 48/08; H04W 48/10; H04W 48/12;
H04W 48/14; H04W 48/16; H04W 72/50;
H04W 72/51; H04W 72/512; H04W
72/52; H04W 72/53; H04W 72/535;
H04W 72/54; H04W 72/541; H04W
72/542; H04W 72/543; H04W 72/56;
H04W 72/563; H04W 72/566; H04W
72/569; H04W 76/15; H04W 76/25;
H04W 88/06
See application file for complete search history.

(56) References Cited

U.S. PATENT DOCUMENTS

| | | | |
|---|---|---|---|
| 9,877,325 | B2 | 1/2018 | Cheng et al. |
| 10,064,113 | B2 | 8/2018 | Karimli et al. |
| 10,075,925 | B2 | 9/2018 | Lepp et al. |
| 10,244,400 | B2 * | 3/2019 | Huang ................ H04W 52/40 |
| 10,631,305 | B2 | 4/2020 | Desai et al. |
| 10,674,370 | B2 | 6/2020 | Clegg |
| 10,716,047 | B2 * | 7/2020 | Meylan ............. H04W 36/1446 |
| 10,791,479 | B2 | 9/2020 | Vargantwar et al. |
| 11,109,239 | B2 | 8/2021 | Lee et al. |
| 11,259,243 | B2 | 2/2022 | Ergen et al. |
| 11,388,662 | B2 | 7/2022 | Wong et al. |
| 11,412,413 | B2 * | 8/2022 | Liu ...................... H04W 16/14 |
| 11,533,630 | B2 | 12/2022 | Futaki |
| 11,570,636 | B2 | 1/2023 | Ergen |
| 11,729,690 | B2 | 8/2023 | Yao et al. |
| 12,058,567 | B2 * | 8/2024 | Gundavelli ....... H04W 28/0865 |
| 2014/0043979 | A1 | 2/2014 | Etemad et al. |
| 2016/0309491 | A1 | 10/2016 | Dai et al. |
| 2018/0129234 | A1 | 5/2018 | Melgar et al. |
| 2018/0288623 | A1 * | 10/2018 | Hampel ............. H04W 16/14 |
| 2019/0069184 | A1 | 2/2019 | Clegg |
| 2019/0306752 | A1 | 10/2019 | Lai |
| 2019/0373481 | A1 | 12/2019 | Lee et al. |
| 2020/0145835 | A1 | 5/2020 | Xu et al. |
| 2020/0305025 | A1 | 9/2020 | Liu et al. |
| 2022/0046507 | A1 | 2/2022 | Krishnan et al. |
| 2022/0400392 | A1 | 12/2022 | Ergen et al. |
| 2023/0262715 | A1 | 8/2023 | Sevindik |
| 2023/0269713 | A1 | 8/2023 | Khalid et al. |

* cited by examiner

MIGRATION OF NETWORK TRAFFIC BETWEEN LICENSED AND UNLICENSED SPECTRUM

RELATED APPLICATIONS

This application is a Continuation of U.S. application Ser. No. 17/857,550, filed on Jul. 5, 2022, entitled, "MIGRATION OF NETWORK TRAFFIC BETWEEN LICENSED AND UNLICENSED SPECTRUM", which is incorporated herein by reference in its entirety.

TECHNICAL FIELD

The subject matter of this disclosure relates in general to the field of computer networking, and more particularly, to migrating user device traffic, applications traffic, user device traffic bound to certain network slices, or user device traffic in certain cell locations between a licensed spectrum and an unlicensed spectrum within the same radio access technology (RAT).

BACKGROUND

Radio spectrum can be categorized into two types, a licensed spectrum and an unlicensed spectrum. A licensed spectrum is assigned exclusively to network operators for independent usage. As follows, licensed spectrum devices operate within the portion of the radio spectrum designated by the Federal Communications Commission (FCC) to be served for organizations that have been granted licenses. With exclusive rights, a license holder operates without interference in transmission. An unlicensed spectrum is assigned to every citizen for non-exclusive usage subject to some regulatory constraints. As follows, network operators can deploy cellular networks with more flexibility to manage interference.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not, therefore, to be considered to be limiting of its scope, the principles herein are described and explained with additional specificity and detail through the use of the accompanying drawings in which.

DETAILED DESCRIPTION

Figure 1A:
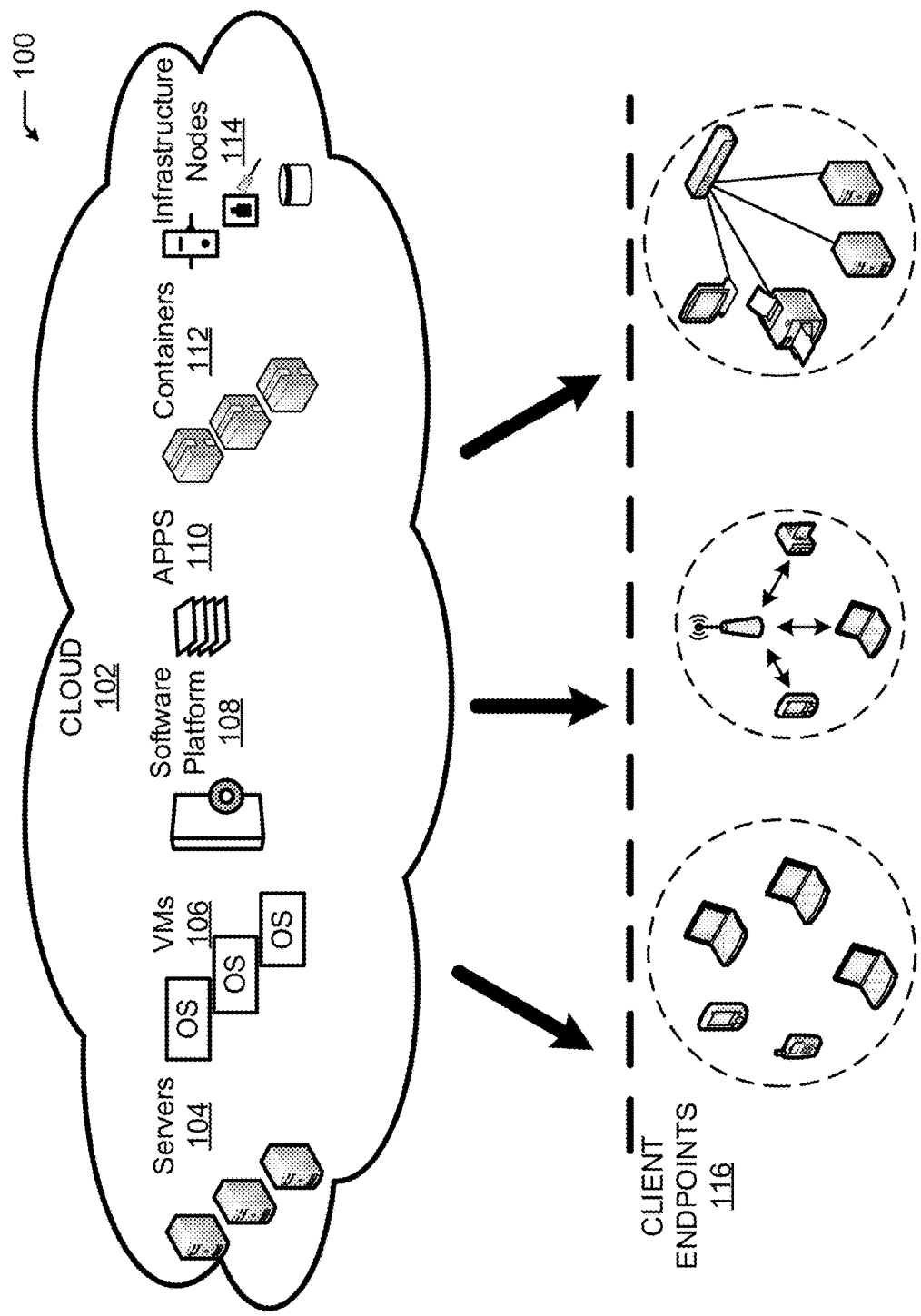
FIG. 1A illustrates an example cloud computing architecture.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims or can be learned by the practice of the principles set forth herein.

Overview

Disclosed herein are systems, methods, and computer-readable media for migrating network data traffic (network traffic) between a licensed spectrum and an unlicensed spectrum within the same radio access technology.

In one aspect, a method includes identifying a user device connected to a cellular wireless access technology, over a licensed spectrum; determining whether a condition for switching network traffic associated with the user device to an unlicensed spectrum is triggered; in response to determining that the condition is triggered, determining an unlicensed spectrum to move the network traffic to, the unlicensed spectrum being within a same cell as the licensed spectrum or in a different cell compared to a cell in which the licensed spectrum is; and migrating at least a portion of the network traffic to the unlicensed spectrum while maintaining network connectivity of the user device over the cellular wireless access technology.

In another aspect, the condition is a schedule of routing of network traffic of the user device between the licensed spectrum and the unlicensed spectrum, and the network traffic is migrated to the unlicensed spectrum according to the schedule.

In another aspect, the condition is a capacity threshold of the licensed spectrum, and the network traffic is migrated to the unlicensed spectrum if the capacity threshold of the licensed spectrum is reached.

In another aspect, the method further includes receiving, from a network element, a usage report that includes a volume of the network traffic of the user device to compare to the capacity threshold.

In another aspect, the method further includes modifying a User Equipment Route Selection Policy (URSP) to migrate the portion of the network traffic to the unlicensed spectrum.

In another aspect, the method further includes determining whether a second condition for switching the network traffic back to the licensed spectrum is met; and migrating the portion of the network traffic back to the licensed spectrum from the unlicensed spectrum.

In another aspect, the method further includes transmitting a Radio Resource Control (RRC) connection reconfiguration message to the user device to migrate the portion of the network traffic to the unlicensed spectrum.

In one aspect, a network controller includes one or more memories having computer-readable instructions stored therein; and one or more processors. The one or more processors are configured to execute the computer-readable instructions to identify a user device connected to a cellular wireless access technology, over a licensed spectrum; determine whether a condition for switching network traffic associated with the user device to an unlicensed spectrum is triggered; in response to determining that the condition is triggered, determine an unlicensed spectrum to move the network traffic to, the unlicensed spectrum being within a same cell as the licensed spectrum or in a different cell compared to a cell in which the licensed spectrum is; and migrate at least a portion of the network traffic to the unlicensed spectrum while maintaining network connectivity of the user device over the cellular wireless access technology.

In one aspect, one or more non-transitory computer-readable media include computer-readable instructions, which when executed by one or more processors of a network controller, cause the network controller to identify a user device connected to a cellular wireless access technology, over a licensed spectrum; determine whether a condition for switching network traffic associated with the user device to an unlicensed spectrum is triggered; in response to determining that the condition is triggered, determine an unlicensed spectrum to move the network traffic to, the unlicensed spectrum being within a same cell as the licensed spectrum or in a different cell compared to a cell in which the licensed spectrum is; and migrate at least a portion of the network traffic to the unlicensed spectrum while maintaining network connectivity of the user device over the cellular wireless access technology.

Description of Example Embodiments

The following acronyms are used throughout the present disclosure, provided below for convenience.
AMF: Access and Mobility Management Function
BNG: Broadband Network Gateway
MBR: Modify Bearer Request
NF: Network Function
NRF: Network Repository Function
PCF: Policy Control Function
PDU: Protocol Data Unit
RAN: Radio Access Network
RAT: Radio Access Technology
RRC: Radio Resource Control
SMF: Session Management Function
UDM: Unified Data Management
UPF: User Plane Function
USRP: UE Route Selection Policy Bandwidth refers to a measure of a bit rate of data communication resources, expressed in a number of bits communicated per unit time. Bandwidth throttling is a technique of reducing the speed at which data is communicated, which can be activated to limit network congestion in case of overcapacity either in a RAN or in a core network. Also, bandwidth throttling can be activated when subscriber usage exceeds a quota. Existing bandwidth throttling approaches utilize activating traffic-shaping rules on user plane functions such as UPF, and BNG. The net effect of bandwidth throttling results in creating two data pipelines, a fast lane and a slow lane. As a result, there can be some performance cost on the user plane function enforcing the artificial slow path rules. Further, these approaches can result in bad user experience for every subscriber using the application chosen for throttling. Therefore, there exists a need for an alternative approach to currently available bandwidth throttling techniques that can improve network traffic and congestion.

As previously described, there are two types of radio spectrums: a licensed spectrum and an unlicensed spectrum. With the increased availability of unlicensed spectrum, network operators can deploy unlicensed spectrum as part of 3GPP access. As follows, a network operator can deploy both licensed spectrum and unlicensed spectrum. For example, a network operator can deploy a network slice in a cell operating in a licensed spectrum and the same network slice in another cell operating in an unlicensed spectrum. In another example, in a given cell, a network operator can operate a network slice in both licensed and unlicensed spectrums. Currently, offloading network traffic to unlicensed non-3GPP access at a RAT level is available. However, the existing approaches do not offer the mechanics of managing network traffic offloading between licensed and unlicensed spectrums within 3GPP access in view of enhancements to network slicing and the envisioned new slice configurations.

Therefore, there exists a need for migrating network data traffic between a licensed spectrum and an unlicensed spectrum within the same RAT. The present technology includes systems, methods, and computer-readable media for solving the foregoing problems and discrepancies, among others. In some examples, systems, methods, and computer-readable media are provided for migrating users, applications, users bound to certain network slices, or users in certain cell locations between a licensed spectrum and an unlicensed spectrum within the same RAT. Further, the proposed solution relates to network traffic (e.g., back to the licensed spectrum) as the network traffic improves.

In particular, the proposed solution can (1) migrate a session, a group of sessions, and certain applications from a licensed spectrum to an unlicensed spectrum (or vice versa) within the same network slice, (2) move a user between a cell supporting a given network slice in a licensed spectrum to another cell supporting the same network slice in an unlicensed spectrum, and (3) bind such migration with various capacity threshold triggers.

FIG. 1A illustrates a diagram of an example cloud computing architecture 100. The architecture can include a cloud 102. The cloud 102 can include one or more private clouds, public clouds, and/or hybrid clouds. Moreover, the cloud 102 can include cloud elements 104-114. The cloud elements 104-114 can include, for example, servers 104, virtual machines (VMs) 106, one or more software platforms 108, applications or services 110, software containers 112, and infrastructure nodes 114. The infrastructure nodes 114 can include various types of nodes, such as compute nodes, storage nodes, network nodes, management systems, etc.

The cloud 102 can provide various cloud computing services via the cloud elements 104-114, such as software as a service (SaagatewayS) (e.g., collaboration services, email services, enterprise resource planning services, content services, communication services, etc.), infrastructure as a service (IaaS) (e.g., security services, networking services, systems management services, etc.), platform as a service (PaaS) (e.g., web services, streaming services, application development services, etc.), and other types of services such as desktop as a service (DaaS), information technology management as a service (ITaaS), managed software as a service (MSaaS), mobile backend as a service (MBaaS), etc.

The client endpoints 116 can connect with the cloud 102 to obtain one or more specific services from the cloud 102. The client endpoints 116 can communicate with elements 104-114 via one or more public networks (e.g., Internet), private networks, and/or hybrid networks (e.g., virtual private network). The client endpoints 116 can include any device with networking capabilities, such as a laptop computer, a tablet computer, a server, a desktop computer, a smartphone, a network device (e.g., an access point, a router, a switch, etc.), a smart television, a smart car, a sensor, a GPS device, a game system, a smart wearable object (e.g., smartwatch, etc.), a consumer object (e.g., Internet refrigerator, smart lighting system, etc.), a city or transportation system (e.g., traffic control, toll collection system, etc.), an internet of things (IoT) device, a camera, a network printer, a transportation system (e.g., train, motorcycle, boat, etc.), or any smart or connected object (e.g., smart home, smart building, smart retail, smart glasses, etc.), and so forth.

The client endpoints 116 can communicate with the elements 104-114 as part of accessing network services through infrastructure intermediation messaging. Specifically, communications between the elements 104-114 and the client endpoints 116 can be managed and otherwise controlled through a network infrastructure between the client endpoints 116 and the cloud 102. For example, any of a 5G infrastructure, an LTE infrastructure and a Wi-Fi infrastructure can communicate a physical location of a client endpoint to a cloud service. In turn, the cloud service can cause the infrastructure to send specific signaling to the client endpoint for accessing network services through the cloud service. For example, the cloud service can use the LTE infrastructure, e.g. through an LTE S14 interface, to alert the client endpoint of Wi-Fi availability through the Wi-Fi infrastructure. In another example, the cloud service can use the Wi-Fi infrastructure, e.g. through MBO Wi-Fi messaging, to alert the client endpoint of LTE availability through the LTE infrastructure.

Figure 1B:
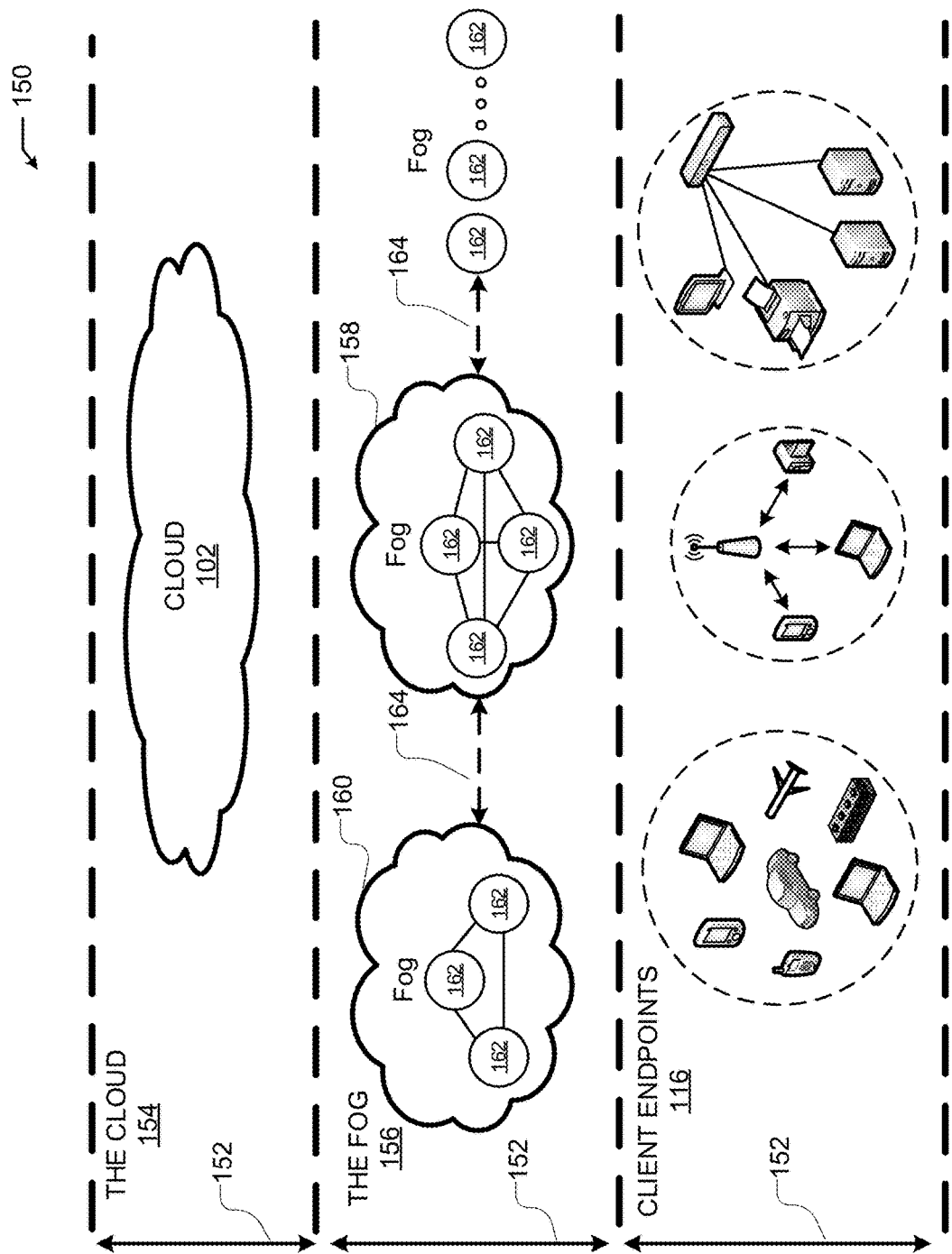
FIG. 1B illustrates an example fog computing architecture

FIG. 1B illustrates a diagram of an example fog computing architecture 150. The fog computing architecture 150 can include the cloud layer 154, which includes the cloud 102 and any other cloud system or environment, and the fog layer 156, which includes fog nodes 162. The client endpoints 116 can communicate with the cloud layer 154 and/or the fog layer 156. The architecture 150 can include one or more communication links 152 between the cloud layer 154, the fog layer 156, and the client endpoints 116. Communications can flow up to the cloud layer 154 and/or down to the client endpoints 116.

The fog layer 156 or "the fog" provides the computation, storage and networking capabilities of traditional cloud networks, but closer to the endpoints. The fog can thus extend the cloud 102 to be closer to the client endpoints 116. The fog nodes 162 can be the physical implementation of fog networks. Moreover, the fog nodes 162 can provide local or regional services and/or connectivity to the client endpoints 116. As a result, traffic and/or data can be offloaded from the cloud 102 to the fog layer 156 (e.g., via fog nodes 162). The fog layer 156 can thus provide faster services and/or connectivity to the client endpoints 116, with lower latency, as well as other advantages such as security benefits from keeping the data inside the local or regional network(s).

The fog nodes 162 can include any networked computing devices, such as servers, switches, routers, controllers, cameras, access points, gateways, etc. Moreover, the fog nodes 162 can be deployed anywhere with a network connection, such as a factory floor, a power pole, alongside a railway track, in a vehicle, on an oil rig, in an airport, in a shopping center, in a hospital, in a park, in a parking garage, in a library, etc.

In some configurations, one or more fog nodes 162 can be deployed within fog instances 158, 160. The fog instances 158, 160 can be local or regional clouds or networks. For example, the fog instances 158, 160 can be a regional cloud or data center, a local area network, a network of fog nodes 162, etc. In some configurations, one or more fog nodes 162 can be deployed within a network, or as standalone or individual nodes, for example. Moreover, one or more of the fog nodes 162 can be interconnected with each other via links 164 in various topologies, including star, ring, mesh or hierarchical arrangements, for example.

In some cases, one or more fog nodes 162 can be mobile fog nodes. The mobile fog nodes can move to different geographic locations, logical locations or networks, and/or fog instances while maintaining connectivity with the cloud layer 154 and/or the endpoints 116. For example, a particular fog node can be placed in a vehicle, such as a train, which can travel from one geographic location and/or logical location to a different geographic location and/or logical location. In this example, the particular fog node may connect to a particular physical and/or logical connection point with the cloud 154 while located at the starting location and switch to a different physical and/or logical connection point with the cloud 154 while located at the destination location. The particular fog node can thus move within particular clouds and/or fog instances and, therefore, serve endpoints from different locations at different times.

Figure 2:
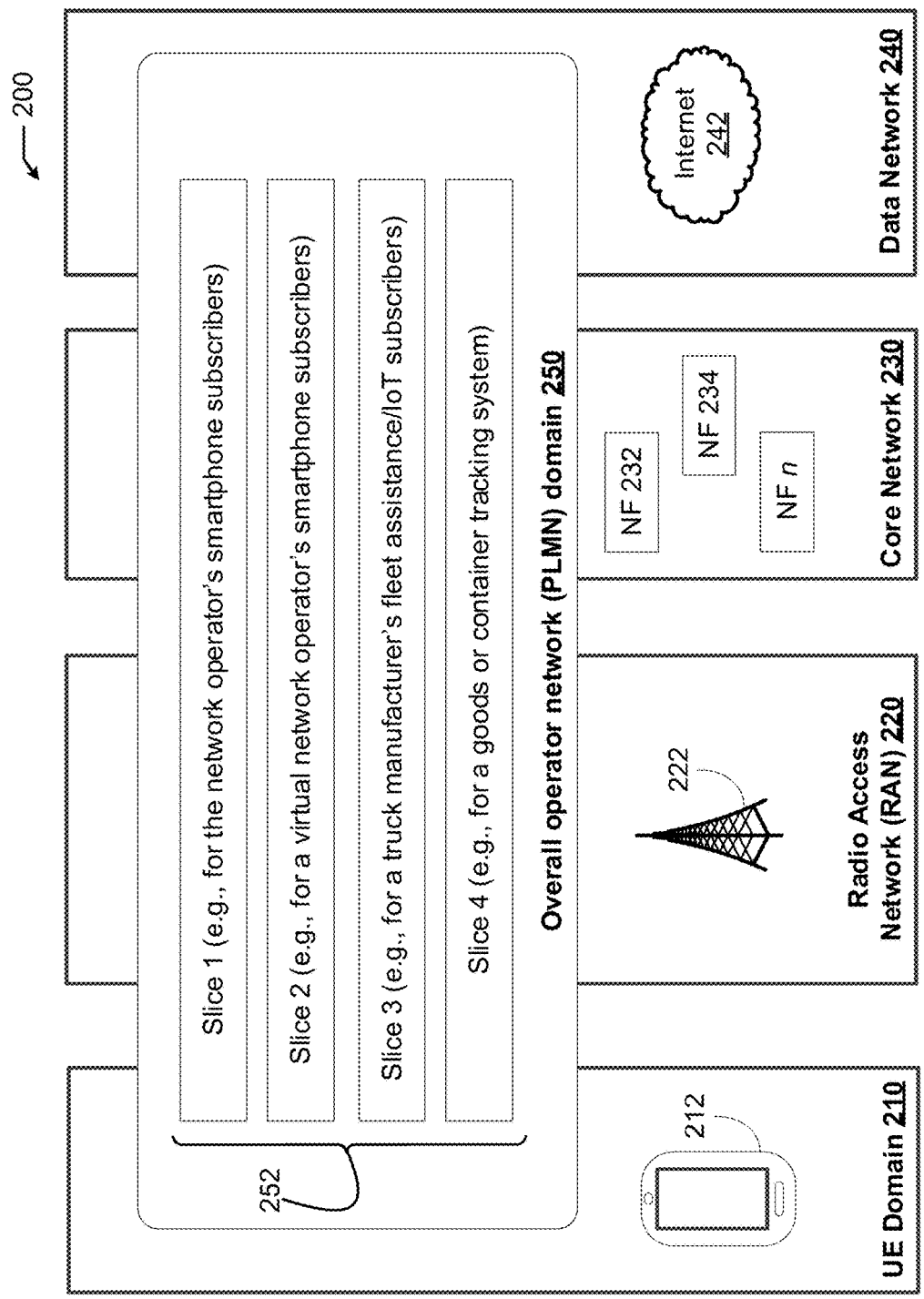
FIG. 2 depicts an exemplary schematic representation of a 5G network environment in which network slicing has been implemented, and in which one or more aspects of the present disclosure may operate.

FIG. 2 depicts an exemplary schematic representation of a 5G network environment 200 in which network slicing has been implemented, and in which one or more aspects of the present disclosure may operate. As illustrated, network environment 200 is divided into four domains, each of which will be explained in greater depth below; a User Equipment (UE) domain 210, e.g. of one or more enterprise, in which a plurality of user cellphones or other connected devices 212 reside; a Radio Access Network (RAN) domain 220, in which a plurality of radio cells, base stations, towers, or other radio infrastructure 222 resides; a Core Network 230, in which a plurality of Network Functions (NFs) 232, 234, . . . , n reside; and a Data Network 240, in which one or more data communication networks such as the Internet 242 reside. Additionally, the Data Network 240 can support SaaS providers configured to provide SaaSs to enterprises, e.g. to users in the UE domain 210.

Core Network 230 contains a plurality of Network Functions (NFs), shown here as NF 232, NF 234 . . . . NF n. In some embodiments, core network 230 is a 5G core network (5GC) in accordance with one or more accepted 5GC architectures or designs. In some embodiments, core network 230 is an Evolved Packet Core (EPC) network, which combines aspects of the 5GC with existing 4G networks. Regardless of the particular design of core network 230, the plurality of NFs typically executes in a control plane of core network 230, providing a service based architecture in which a given NF allows any other authorized NFs to access its services. For example, a Session Management Function (SMF) controls session establishment, modification, release, etc., and in the course of doing so, provides other NFs with access to these constituent SMF services.

In some embodiments, the plurality of NFs of core network 230 can include one or more Access and Mobility Management Functions (AMF; typically used when core network 230 is a 5GC network) and Mobility Management Entities (MME; typically used when core network 230 is an EPC network), collectively referred to herein as an AMF/MME for purposes of simplicity and clarity. In some embodiments, an AMF/MME can be common to or otherwise shared by multiple slices of the plurality of network slices 252, and in some embodiments an AMF/MME can be unique to a single one of the plurality of network slices 252.

The same is true of the remaining NFs of core network 230, which can be shared amongst one or more network slices or provided as a unique instance specific to a single one of the plurality of network slices 252. In addition to NFs comprising an AMF/MME as discussed above, the plurality of NFs of the core network 230 can additionally include one or more of the following: User Plane Functions (UPFs); Policy Control Functions (PCFs); Authentication Server Functions (AUSFs); Unified Data Management functions (UDMs); Application Functions (AFs); Network Exposure Functions (NEFs); NF Repository Functions (NRFs); and Network Slice Selection Functions (NSSFs). Various other NFs can be provided without departing from the scope of the present disclosure, as would be appreciated by one of ordinary skill in the art.

Across these four domains of the 5G network environment 200, an overall operator network domain 250 is defined. The operator network domain 250 is in some embodiments a Public Land Mobile Network (PLMN), and can be thought of as the carrier or business entity that provides cellular service to the end users in UE domain 210. Within the operator network domain 250, a plurality of network slices 252 are created, defined, or otherwise provisioned in order to deliver a desired set of defined features and functionalities, e.g. SaaSs, for a certain use case or corresponding to other requirements or specifications. Note that network slicing for the plurality of network slices 252 is implemented in end-to-end fashion, spanning multiple disparate technical and administrative domains, including management and orchestration planes (not shown). In other words, network slicing is performed from at least the enterprise or subscriber edge at UE domain 210, through the RAN 220, through the 5G access edge and the 5G core network 230, and to the data network 240. Moreover, note that this network slicing may span multiple different 5G providers.

For example, as shown here, the plurality of network slices 252 include Slice 1, which corresponds to smartphone subscribers of the 5G provider who also operates network domain, and Slice 2, which corresponds to smartphone subscribers of a virtual 5G provider leasing capacity from the actual operator of network domain 250. Also shown is Slice 3, which can be provided for a fleet of connected vehicles, and Slice 4, which can be provided for an IoT goods or container tracking system across a factory network or supply chain. Note that these network slices 252 are provided for purposes of illustration, and in accordance with the present disclosure, and the operator network domain 250 can implement any number of network slices as needed, and can implement these network slices for purposes, use cases, or subsets of users and user equipment in addition to those listed above. Specifically, the operator network domain 250 can implement any number of network slices for provisioning SaaSs from SaaS providers to one or more enterprises.

5G mobile and wireless networks will provide enhanced mobile broadband communications and are intended to deliver a wider range of services and applications as compared to all prior generation mobile and wireless networks. Compared to prior generations of mobile and wireless networks, the 5G architecture is service based, meaning that wherever suitable, architecture elements are defined as network functions that offer their services to other network functions via common framework interfaces. In order to support this wide range of services and network functions across an ever-growing base of user equipment (UE), 5G networks incorporate the network slicing concept utilized in previous generation architectures.

Within the scope of the 5G mobile and wireless network architecture, a network slice comprises a set of defined features and functionalities that together form a complete Public Land Mobile Network (PLMN) for providing services to UEs. This network slicing permits for the controlled composition of a PLMN with the specific network functions and provided services that are required for a specific usage scenario. In other words, network slicing enables a 5G network operator to deploy multiple, independent PLMNs where each is customized by instantiating only those features, capabilities and services required to satisfy a given subset of the UEs or a related business customer needs.

In particular, network slicing is expected to play a critical role in 5G networks because of the multitude of use cases and new services 5G is capable of supporting. Network service provisioning through network slices is typically initiated when an enterprise requests network slices when registering with AMF/MME for a 5G network. At the time of registration, the enterprise will typically ask the AMF/MME for characteristics of network slices, such as slice bandwidth, slice latency, processing power, and slice resiliency associated with the network slices. These network slice characteristics can be used in ensuring that assigned network slices are capable of actually provisioning specific services, e.g. based on requirements of the services, to the enterprise.

Figure 3:
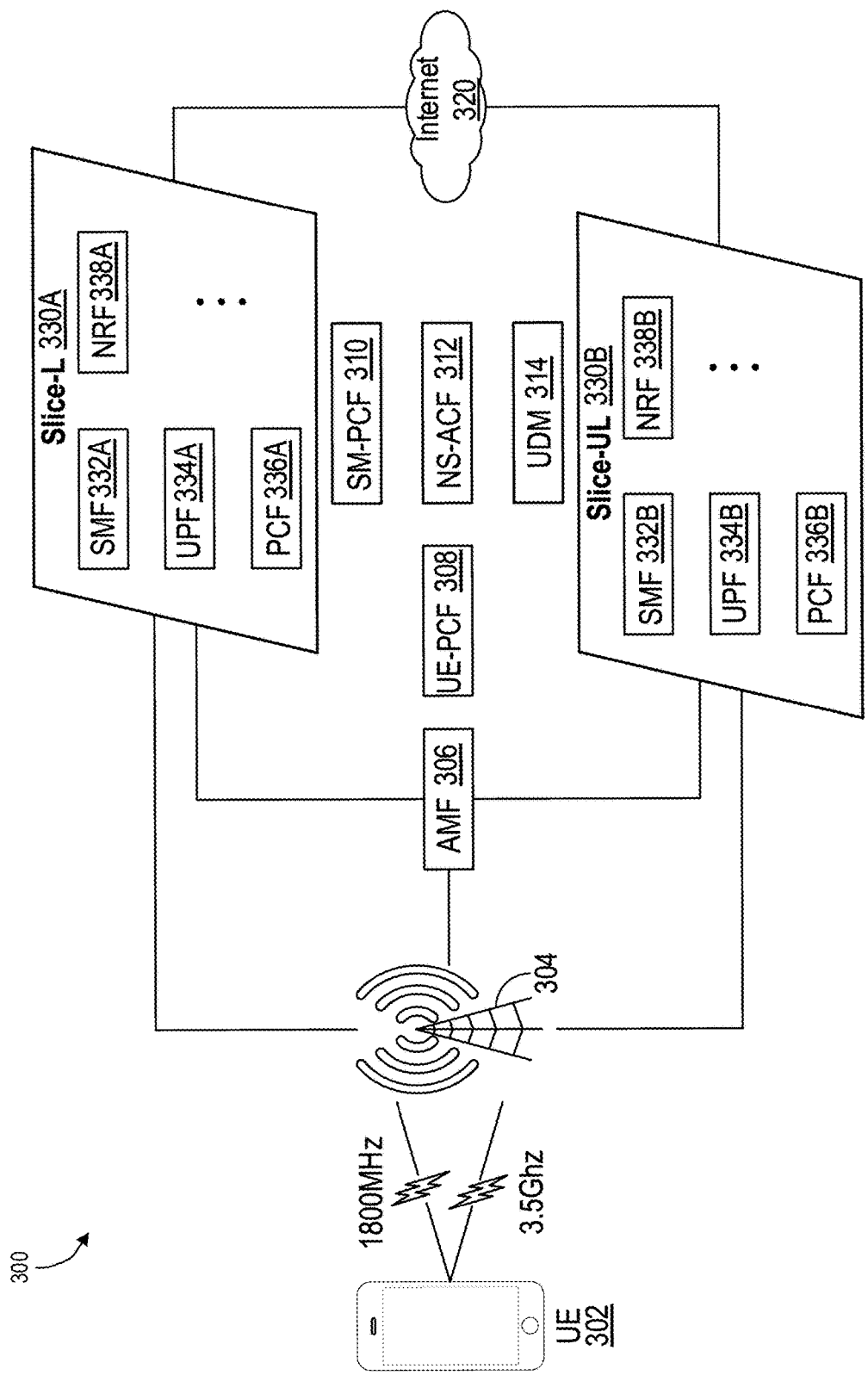
FIG. 3 illustrates an example 5G network architecture with the deployment of two network slices according to some aspects of the present disclosure.

FIG. 3 illustrates an example 5G network architecture 300 with the deployment of two network slices according to some aspects of the present disclosure. Example 5G network architecture 300 comprises UE 302, RAN 304, a first slice 330A operating in a licensed spectrum and a second slice 330B operating in an unlicensed spectrum, and Internet 320. Further, a cellular network with RAN 304 comprises a plurality of network functions such as AMF 306, UE-PCF 308, SM-PCF 310, NS-ACF 312, and UDM 314. Each of the first slice 330A operating in the licensed spectrum and the second slice 330B operating in the unlicensed spectrum comprises multiple network functions such as SMF 332A, UPF 334A, PCF 336A, NRF 338A in the first slice 330A and SMF 332B, UPF 334B, PCF 336B, and NRF 338B in the second slice 330B.

Referring to FIG. 2, the operator network domain 250 that provides cellular service to end-users in UE domain 210 (e.g., UE 302 as illustrated in FIG. 3) can deploy a plurality of slices, Slice 1, Slice 2, Slice 3, and Slice 4 (e.g., first slice 330A and second slice 330B as illustrated in FIG. 2) where the network slicing can be performed from at least the enterprise or subscriber edge at UE domain 210, through RAN 220 (e.g., RAN 304 as illustrated in FIG. 3), through the 5G access edge and 5G core network 230, and to the network 240 (e.g., Internet 320 as illustrated in FIG. 3).

In some examples, RAN 304 can support both the first cell operating in the licensed spectrum (e.g., 1800 MHZ) and the second cell operating in the unlicensed spectrum (e.g., 3.5 GHz). For example, a network operator can deploy two network slices, first slice 330A (e.g., Internet-L) and second slice 330B (e.g., Internet-UL), for the same service. More specifically, a network operator can have two cells, one is a licensed cell (e.g., cell-L) and another an unlicensed cell (e.g., cell-UL). As follows, first slice 330A (e.g., Internet-L) can be attached to the licensed cell (e.g., cell-L) and second slice 330B (e.g., Internet-UL) can be attached to the unlicensed cell (e.g., cell-UL). Any time the network operator throttles its service, the network operator can change the URSP for a user device and all (or a portion of) traffic can be directed to the unlicensed slice (i.e., unlicensed cell). As this approach results in changing the network slice, there can be PDU impact (i.e., session continuity).

In some examples, network data traffic that is transmitted to the licensed spectrum (i.e., first cell 330A) can be moved/migrated to the unlicensed spectrum (i.e., second cell 330B), which can be activated by various triggers. According to some examples, migration of the network traffic can be initiated by various triggers. Examples of triggers can include, but are not limited to, the following conditions: (1) a subscriber has exceeded its quota or violated fair usage policy (FUP); (2) RAN is experiencing a heavy load on a licensed spectrum; (3) the network slice in operation has hit the maximum per-slice-MBR threshold; (4) a given subscriber has hit a per-UE-per-slice-MBR threshold; (5) a given subscriber has hit a per-slice PDU Session Count limit; and (6) User Plane hits maximum forwarding capacity limits.

FIGS. 4A-4D illustrate an example flow 400 of migrating network traffic from a network slice operating in a licensed spectrum to a network slice operating in an unlicensed spectrum according to some aspects of the present disclosure. Similar to example 5G network architecture 300 as illustrated in FIG. 3, network environment for example flow 400 in FIGS. 4A-4D comprises UE 302, gNodeB (i.e., RAN) 304, AMF 306, SMF 332A of the licensed spectrum, UPF 334A of the licensed spectrum, SMF 332B of the unlicensed spectrum, UPF 334B of the unlicensed spectrum, UE-PCF 308, SM-PCF 310, NS-ACF 312, and UDM 314.

Figure 4A:
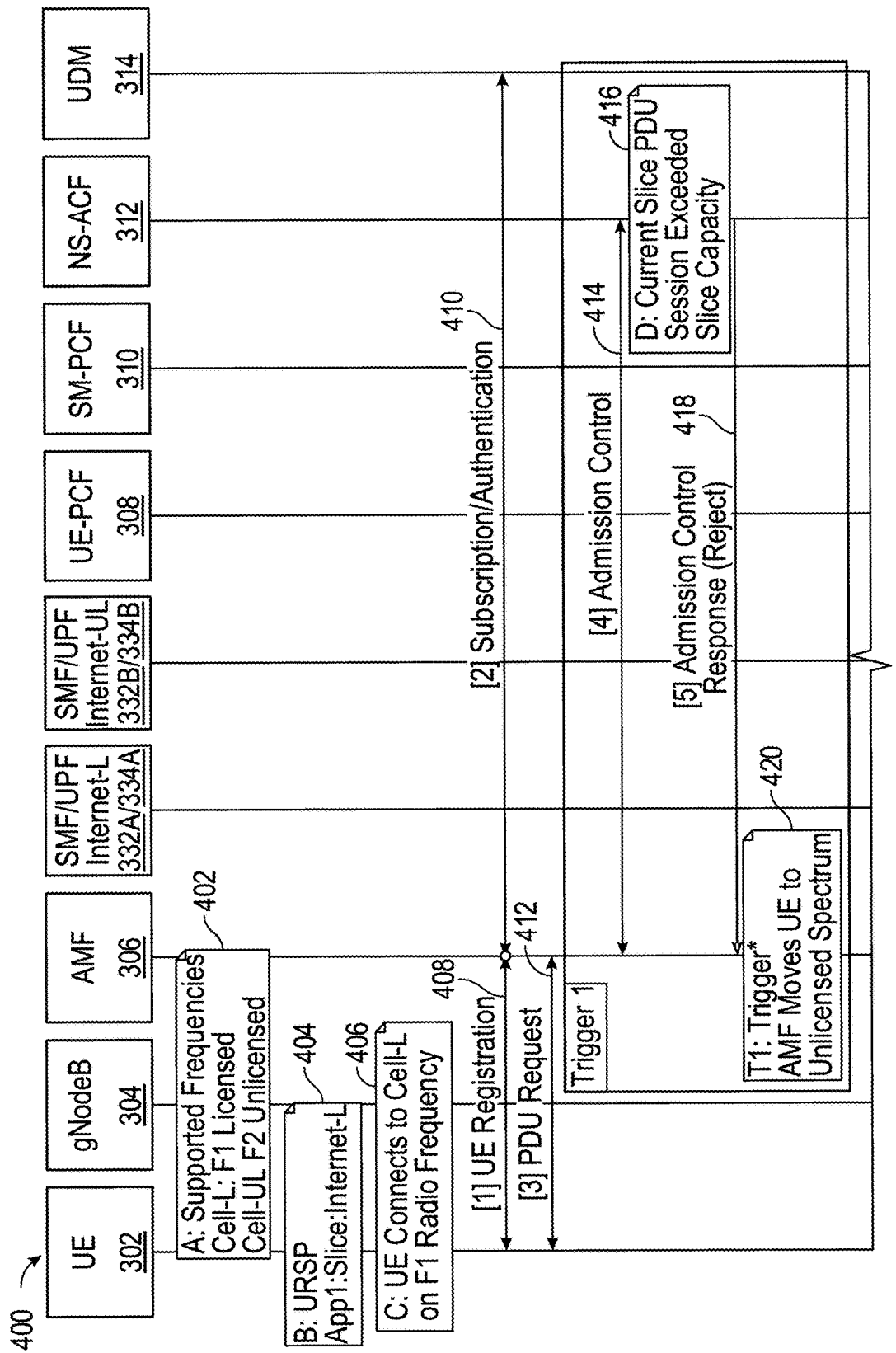
FIGS. 4A-4D illustrate an example flow of migrating network traffic from a network slice operating in a licensed spectrum to a network slice operating in an unlicensed spectrum, according to some aspects of the present disclosure.

FIG. 4A, in particular, illustrates the process of UE registration and the first example of a trigger (Trigger 1) for the migration of network traffic. According to some examples, at step 402, a network operator can have gNodeB 304 that supports both a first cell operating in a licensed spectrum on F1 radio frequency and a second cell operating in an unlicensed spectrum on F2 radiofrequency.

At step 404, UE 302 starts an application, which then according to a URSP associated with the application, can select a network cell operating in a licensed spectrum. As follows, at step 406, UE 302 connects to the network cell operating in the licensed spectrum on F1 radiofrequency.

At step 408, UE registration is completed between UE 302 and AMF 306. At step 410, AMF 306 and UDM 314 confirm the subscription of UE 302 and process authentication of UE 302. At step 412, UE 302 sends a request to establish a PDU Session to AMF 306 via gNodeB 304, which then sends a PDU Session response to UE 402.

In some examples, the migration of network traffic from a licensed spectrum to an unlicensed spectrum can be triggered when a per-slice PDU session exceeds a slice capacity. More specifically, at step 414, UE 302 sends an Admission Control request to NS-ACF 312. At step 416, NS-ACF 312 determines that the current slice PUD session has exceeded a predefined slice capacity. As follows, at step 418, NS-ACF 312 transmits, to AMF 306, an Admission Control Response with a rejection, which would trigger AMF 306 for the migration of the network traffic. For example, at step 420, AMF 306 is triggered to move UE 302 to the unlicensed spectrum. In some examples, a portion of the network traffic of UE 302, if not all, can be migrated to the unlicensed spectrum.

Figure 4B:
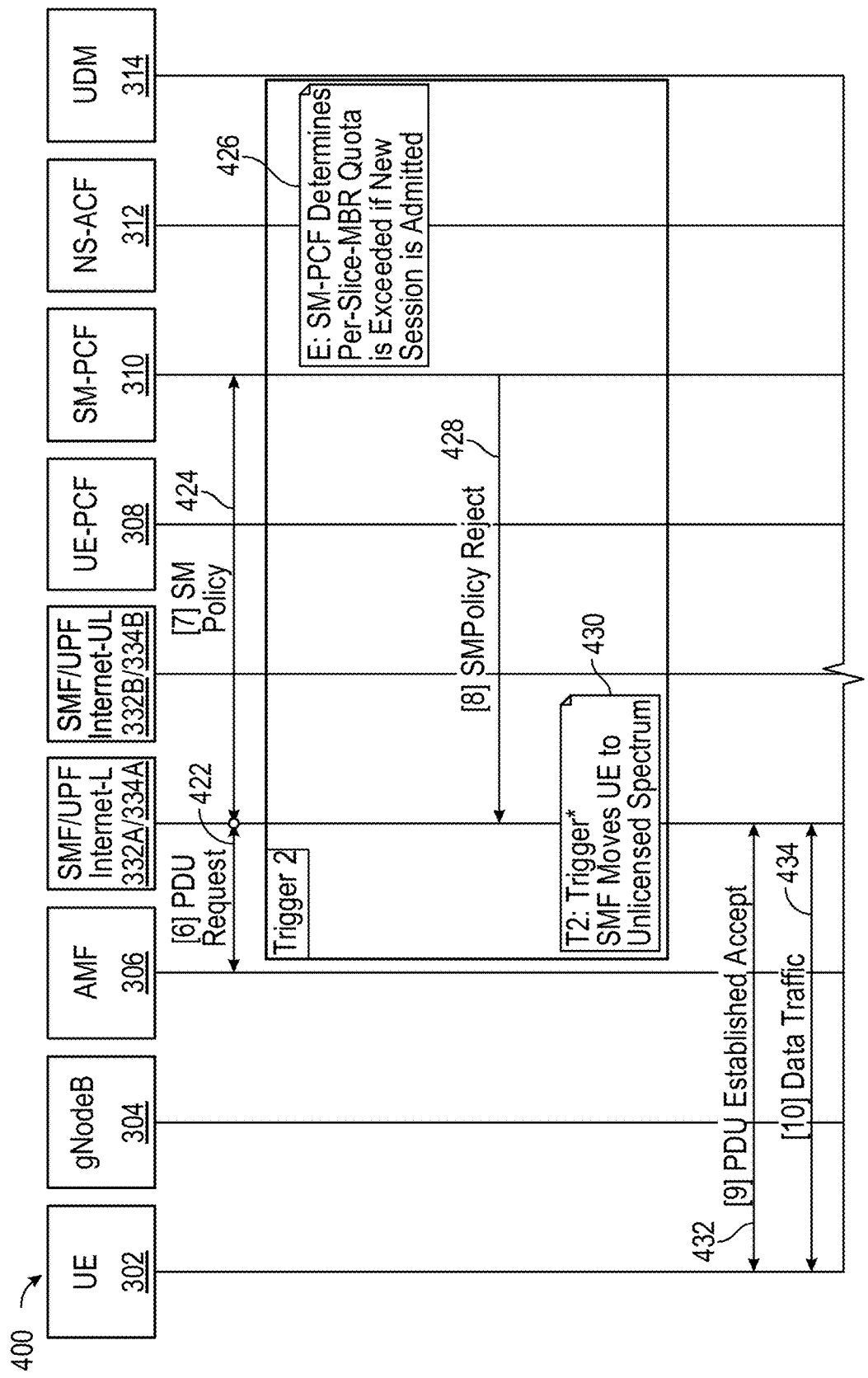

FIG. 4B is a continuous diagram of FIG. 4A. In particular, FIG. 4B illustrates the second example of the trigger (Trigger 2) for the migration of network traffic. At step 422, AMF 306 sends a request to establish a PDU Session to SMF 332A/UPF 334A, which then sends an SM policy to SM-PCF 310 at step 424. At step 426, SM-PCF 210 determines that a per-slice-MBR quota would be exceeded if a new PDU session is admitted. As follows, at step 428, SM-PCF 310 sends a rejection message to SMF 332A/UPF 334A. Thus, at step 430, SMF 332A is triggered to move UE to the unlicensed spectrum. In some examples, a portion of the network traffic of UE 302, if not all, can be migrated to the unlicensed spectrum.

Figure 4C:
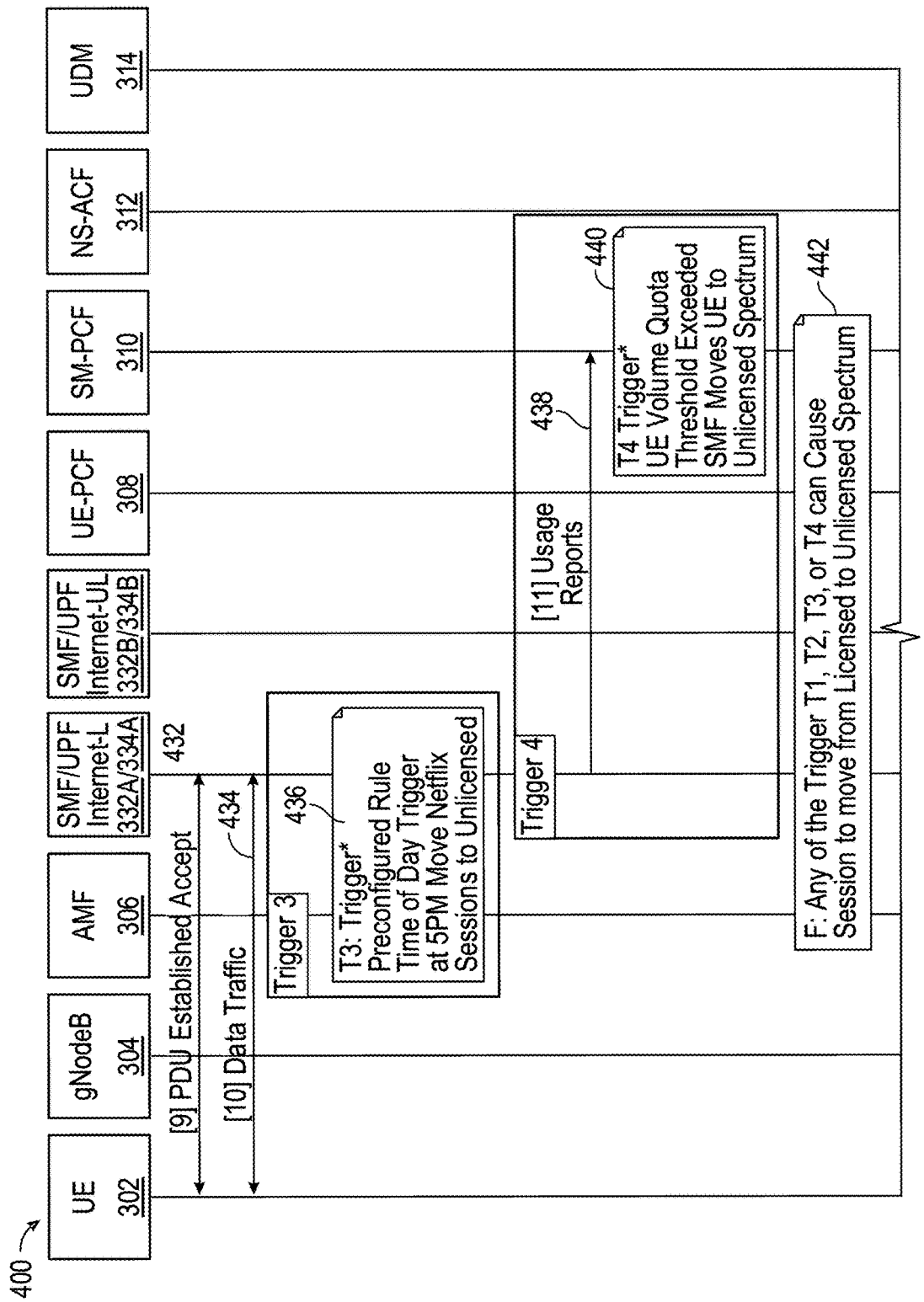

FIG. 4C is a continuous diagram of FIG. 4B. In particular, FIG. 4C illustrates the process of the migration of network traffic activated by two different examples of triggers (e.g., Trigger 3 and Trigger 4). At step 432, the PDU establishment is accepted between UE 302 and SMF 332A/UPF 334A. As a result, at step 434, network traffic associated with UE 302 is directed to SMF 432A/UPF 434A.

At step 436, AMF 306 can be triggered to migrate, to the unlicensed spectrum, a portion of the network traffic associated with UE 302 based on a predefined schedule (e.g., at 4 pm or any other configurable time-based trigger or schedule). Further, the schedule can define which session/application or an amount of the network data to be migrated to the unlicensed spectrum.

In some examples, at step 438, SMF 332A/UPF 334A of the licensed spectrum can send a usage report to SM-PCF 310. The usage report can include a volume of network data that has been used by UE 302. At step 440, SM-PCF 310 can trigger SMF 332A to move UE 302 to the unlicensed spectrum if the UE volume of network data has exceeded a quota threshold.

As shown in FIGS. 4A-4C, any of Trigger 1, Trigger 2, Trigger 3, or Trigger 4 can cause the Session of UE 302 to move from the licensed spectrum to the unlicensed spectrum at step 442. While four example triggers are described with reference to FIGS. 4A-4C, the present disclosure is not limited to these four examples and any other trigger for moving network traffic from a licensed spectrum to an unlicensed spectrum may fall within the scope of the present disclosure.

Figure 4D:
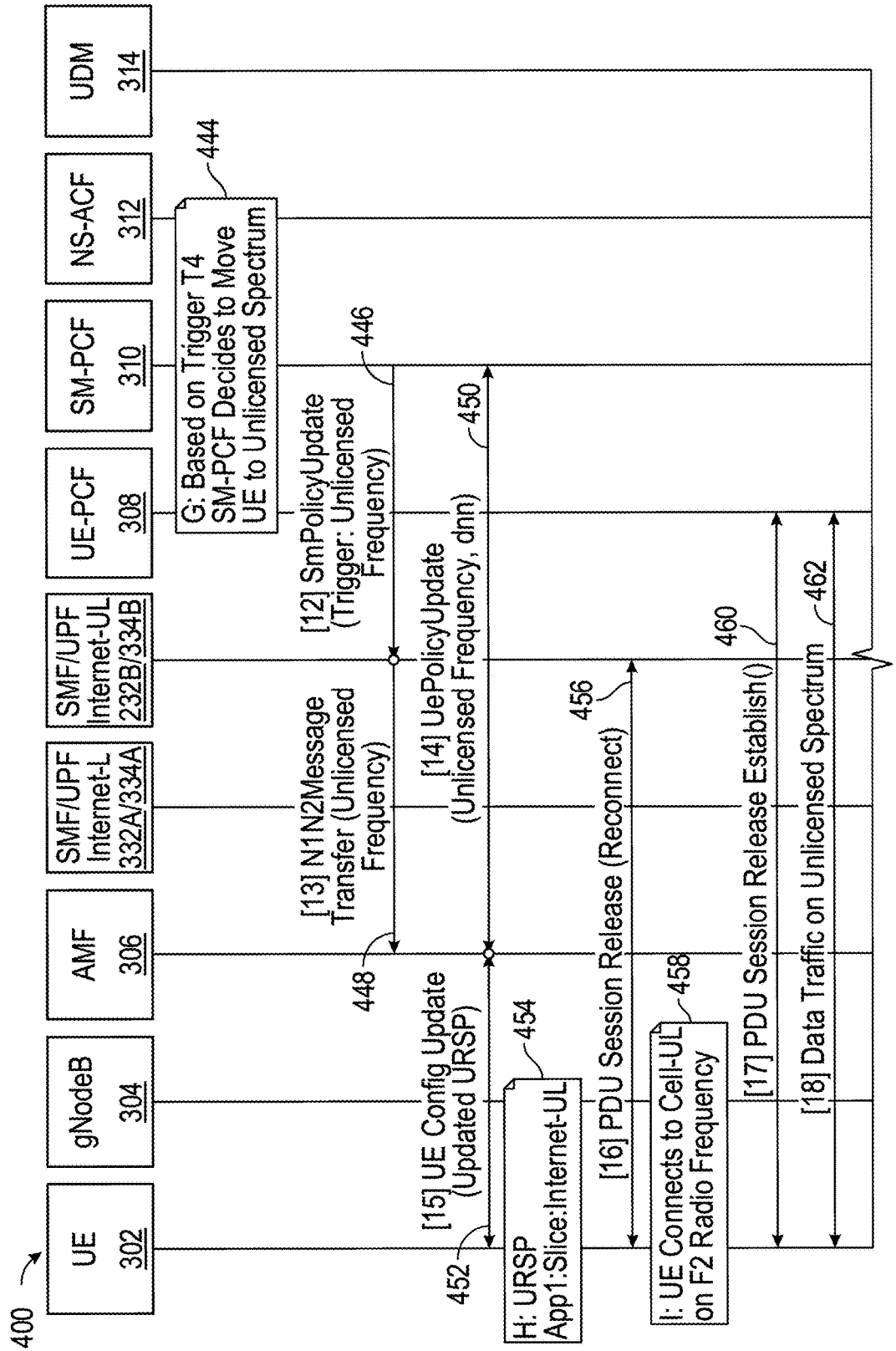

FIG. 4D is a continuous diagram of FIG. 4C. At step 444, SM-PCF 310 can decide to move UE 302 to the unlicensed spectrum. At step 446, SM-PCF 310 sends an SM policy update message, to SMF 332B/UPF 334B of the unlicensed spectrum, regarding the migration of the session to the unlicensed frequency. At step 448, SMF 332B/UPF 334B of the unlicensed spectrum sends an N1/N2 message to AMF 406 regarding the same.

In some examples, at step 452, SM-PCF 310 sends a UE Policy Update message to AMF 306, which then sends a UE configuration update to UE 302 (e.g., updated URSP) at step 452. At step 454, UE 302 can start the application, which then according to the updated URSP, selects a network cell operating in a licensed spectrum. At step 456, UE 302 sends a PDU Session Release message (e.g., to reconnect) to SMF 332B/UPF 334B of the unlicensed spectrum. As follows, at step 458, UE 302 connects to the network cell operating in the unlicensed spectrum on F2 radiofrequency. At step 460, a PDU Session Release is established between UE 302 and UE-PCF 308. Further, at step 462, the network traffic of UE 302 is transmitted on the unlicensed spectrum.

Figure 5:
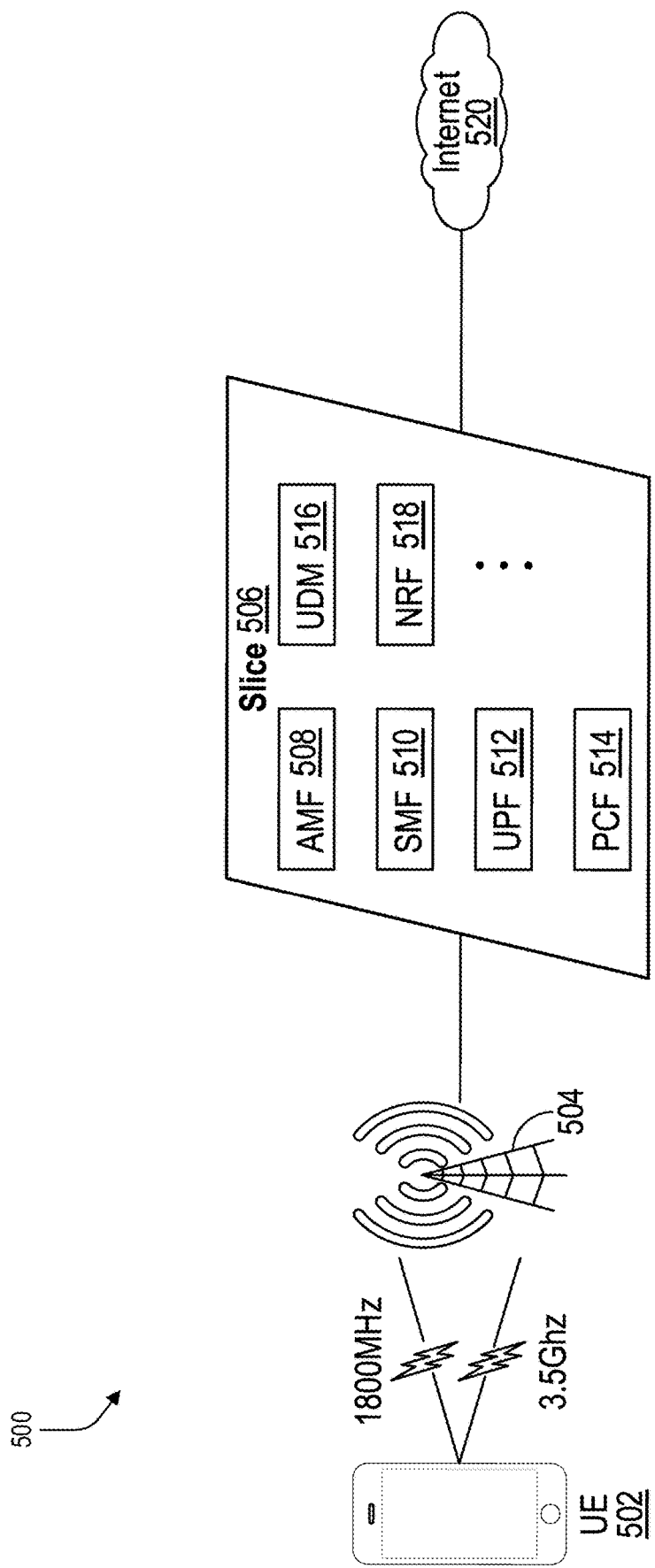
FIG. 5 illustrates an example 5G network architecture with the deployment of a single network slice, according to some aspects of the present disclosure.

FIG. 5 illustrates an example 5G network architecture 500 with the deployment of a single network slice, according to some aspects of the present disclosure. Example 5G network architecture 500 comprises UE 502 (can be the same as UE 302), gNodeB 504 (can be the same as gNodeB 304), network slice 506, and Internet 520. Further, network slice 506 can have a plurality of associated network functions such as AMF 508, SMF 510, UPF 512, PCF 514, UDM 516, NRF 518, etc.

In some examples, network slice 506 can operate in both a licensed spectrum (e.g., 1800 MHz) and an unlicensed spectrum (e.g., 2.5 GHZ). More specifically, a network operator can have one slice, which operates on both licensed and unlicensed frequencies. As follows, any time the network operator throttles its service, a user device can switch from a licensed spectrum to an unlicensed spectrum based on an RRC reconfiguration. Under this approach, since the network slice does not change, there is no PDU impact. Further, in some examples, UE 502 can have an application that must be on a licensed spectrum and another application that must be on an unlicensed spectrum.

Figure 6:
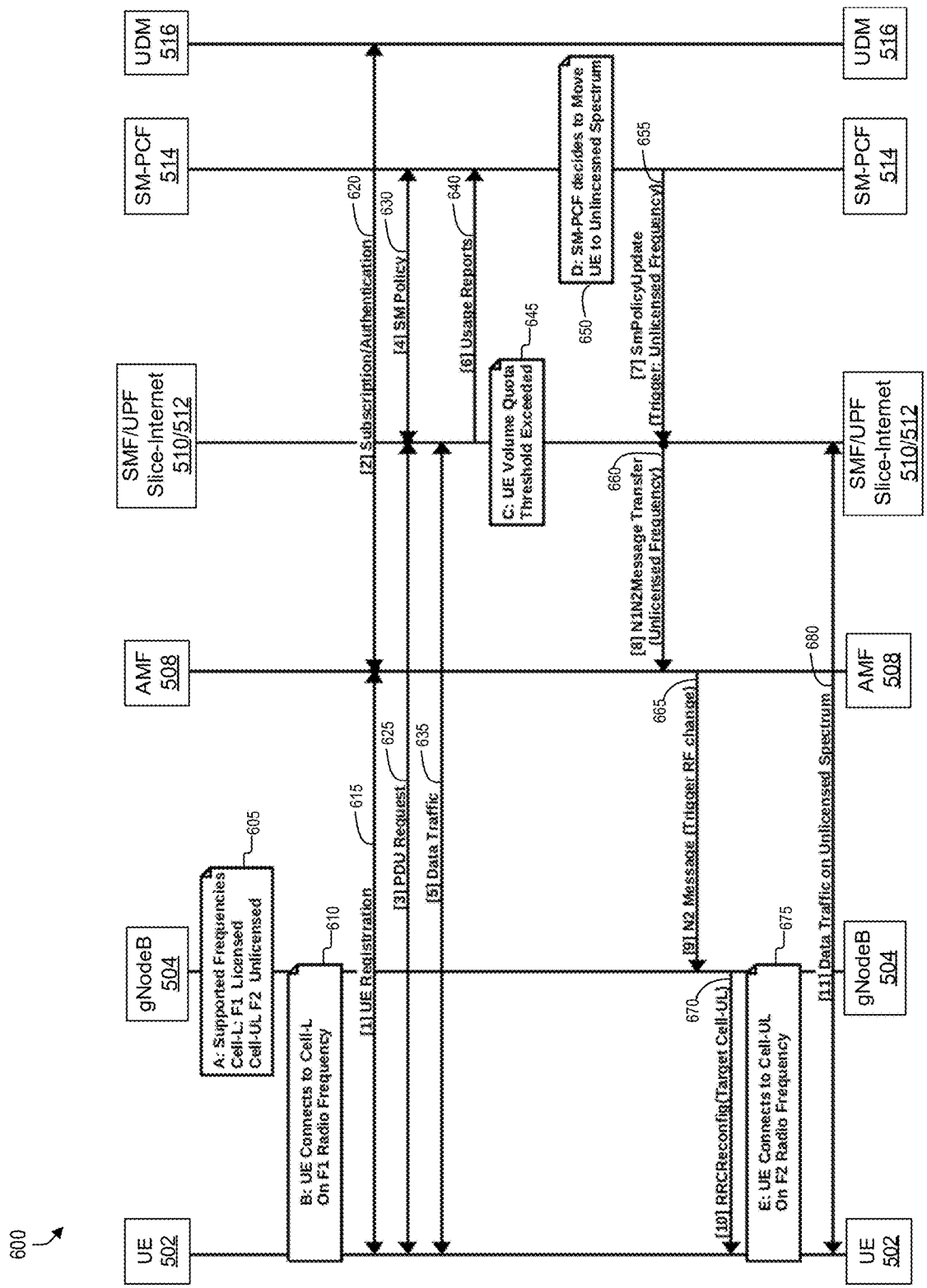
FIG. 6 illustrates an example flow of migrating network traffic from a licensed spectrum to an unlicensed spectrum within the same network slice, according to some aspects of the present disclosure.

FIG. 6 illustrates an example flow 600 of migrating network traffic from a licensed spectrum to an unlicensed spectrum within the same network slice, according to some aspects of the present disclosure. Similar to example 5G network architecture 500 as illustrated in FIG. 5, network environment for example flow 600 in FIG. 5 comprises UE 502, gNodeB 504, AMF 508, SMF 510, UPF 512, SM-PCF 514, and UDM 516.

According to some examples, gNodeB 504 can be configured to support both licensed and unlicensed frequencies (e.g., cell-L on F1 radiofrequency and cell-UL on F2 radiofrequency) at step 605. At step 610, UE 502 connects to cell-L on F1 radiofrequency via gNodeB 504.

At step 615, UE registration is completed between UE 502 and AMF 508. At step 620, AMF 508 and UMD 516 confirm the subscription of UE 502 and process authentication of UE 502. At step 625, UE 502 sends a PDU request (i.e., a request to establish a PDU session) to SMF 510/UPF 512, which then sends an SM policy message to SM-PCF 514 at step 630.

At step 635, network traffic associated with UE 502 is directed to SMF 510/UPF 512. At step 640, SMF 510/UPF 512 prepares and sends a usage report to SM-PCF 514. In some instances, the usage report can include a volume of network data associated with UE 502. At step 645, SMF 510/UPF 512 determines that the volume of network data associated with UE 502 has exceeded a quota threshold. As follows, at step 650, SM-PCF 514 decides to move UE 502 to an unlicensed spectrum (i.e., direct the network traffic associated with UE 502 to the unlicensed spectrum).

At step 655, SM-PCF 514 sends an SM policy update message to SMF 510/UPF 512, which indicates the migration of network traffic to the unlicensed spectrum. At step 660, SMF 510/UPF 512 sends an N1/N2 message to AMF 508 regarding the same. At step 665, AMF 508 forwards the N2 message to gNodeB 504, which then sends an RRC reconfiguration to UE 502 at step 670.

At step 675, UE 502, based on the RRC reconfiguration, connects to cell-UL on F2 radiofrequency. As follows, at step 680, network traffic associated with UE 502 is now directed to the unlicensed spectrum.

While example flow 600 includes the migration of network traffic triggered by the volume of network data exceeding a quota threshold (e.g., Trigger 4 as illustrated with respect to FIG. 3), other types of triggers can be applied.

Figure 7:
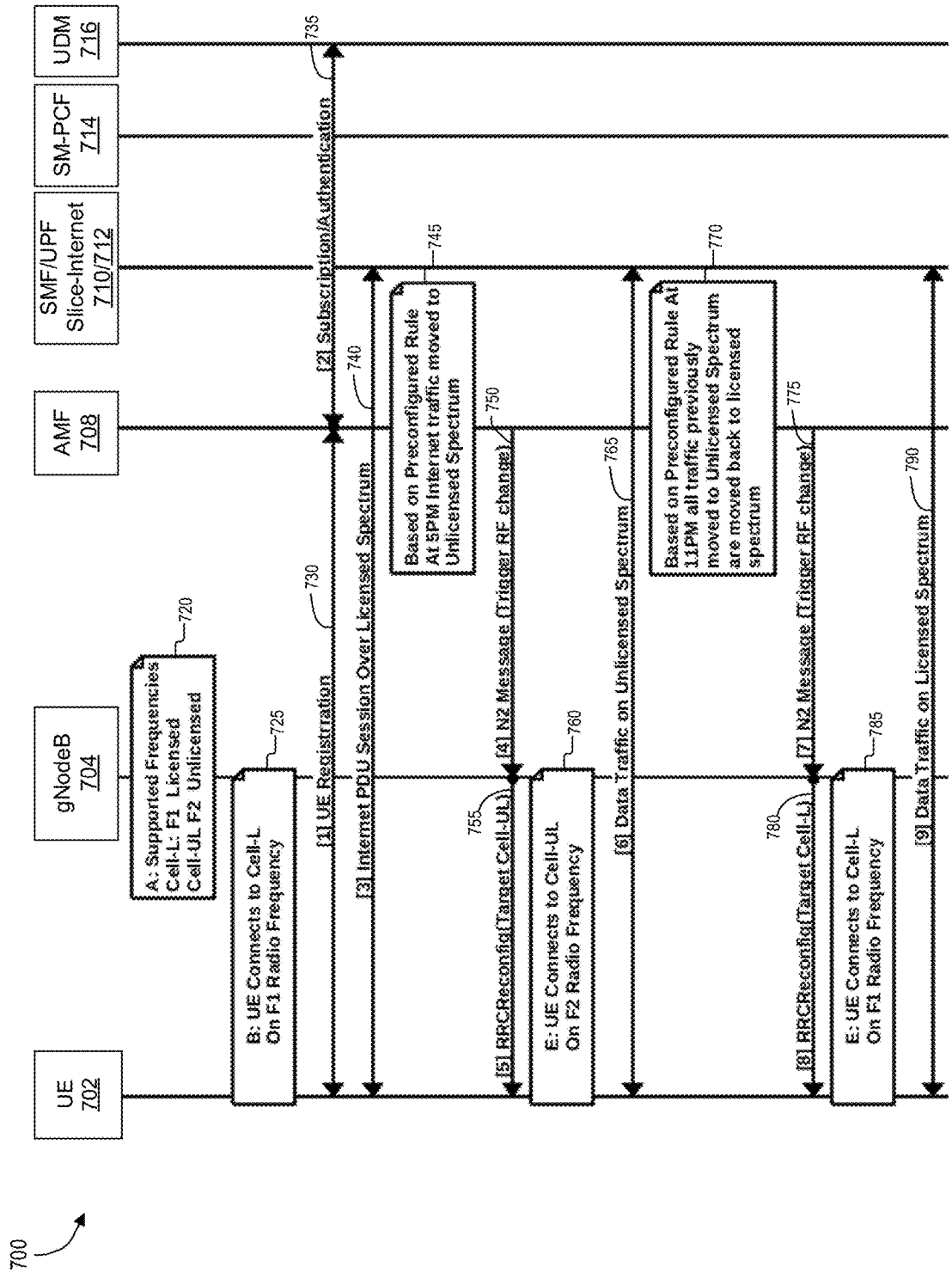
FIG. 7 illustrates an example flow of reverting network traffic from an unlicensed spectrum to a licensed spectrum, according to some aspects of the present disclosure.

FIG. 7 illustrates an example flow 700 of reverting network traffic from an unlicensed spectrum to a licensed spectrum, according to some aspects of the present disclosure. Network environment for example flow 700 comprises UE 702 (can be the same as UE 302/502), gNodeB 704 (can be the same as gNodeB 304/504), AMF 708, SMF 710/UPF 712, SM-PCF 714, and UDM 716.

At step 720, gNodeB 704 can be configured to support both licensed and unlicensed frequencies (e.g., cell-L on F1 radio frequency and cell-UL on F2 radiofrequency). At step 725, UE 702 connects to cell-L on F1 radio frequency via gNodeB 704.

At step 730, UE registration is completed between UE 702 and AMF 708. At step 635, AMF 708 and UMD 716 confirm the subscription of UE 702 and process authentication of UE 702. At step 740, UE 702 sends an internet PDU session over the licensed spectrum to SMF 710/UPF 712.

At step 745, based on a preconfigured rule, AMF 708 moves a portion of or all traffic associated with UE 702 to an unlicensed spectrum (e.g., based on Trigger 3 as illustrated in FIG. 3). While example flow 700 includes the migration of the network traffic to the unlicensed spectrum triggered by a preconfigured rule, other types of triggers can be applied.

At step 750, AMF 708 sends an N2 message to gNodeB 704 indicating the radiofrequency change. At step 755, gNodeB 704 sends an RRC reconfiguration to UE 702. As follows, UE 702, based on the RRC reconfiguration, connects to cell-UL on F2 radiofrequency via gNodeB 704 at step 760. Thus, network traffic associated with UE 602 is now directed on the unlicensed spectrum to SMF 710/UPF 712 at step 765.

In some examples, at step 770, based on a preconfigured rule, all traffic previously moved to the unlicensed spectrum can be moved back to a licensed spectrum. For example, the preconfigured rule can define a schedule for what time the traffic needs to be directed to a licensed spectrum or an unlicensed spectrum. Further, the preconfigured rule can define which and what portion of the network traffic needs to be migrated to the unlicensed spectrum or reverted to the licensed spectrum.

At step 775, AMF 708 sends an N2 message indicating the radiofrequency change (e.g., from F2 radio frequency to F1 radio frequency) to gNodeB 704. At step 780, gNodeB 704 can send an RRC reconfiguration regarding the same to UE 702. As follows, UE 702 connects to cell-L on F1 radio frequency via gNodeB 704 at step 785. Thus, network traffic associated with UE 702 is directed on the licensed spectrum at step 790.

While example flow 700 includes the reverting process, which is triggered by a preconfigured rule, any other types of triggers for reverting network traffic back to the licensed spectrum from the unlicensed spectrum can be used and falls within the scope of the present disclosure. can be applied.

Figure 8:
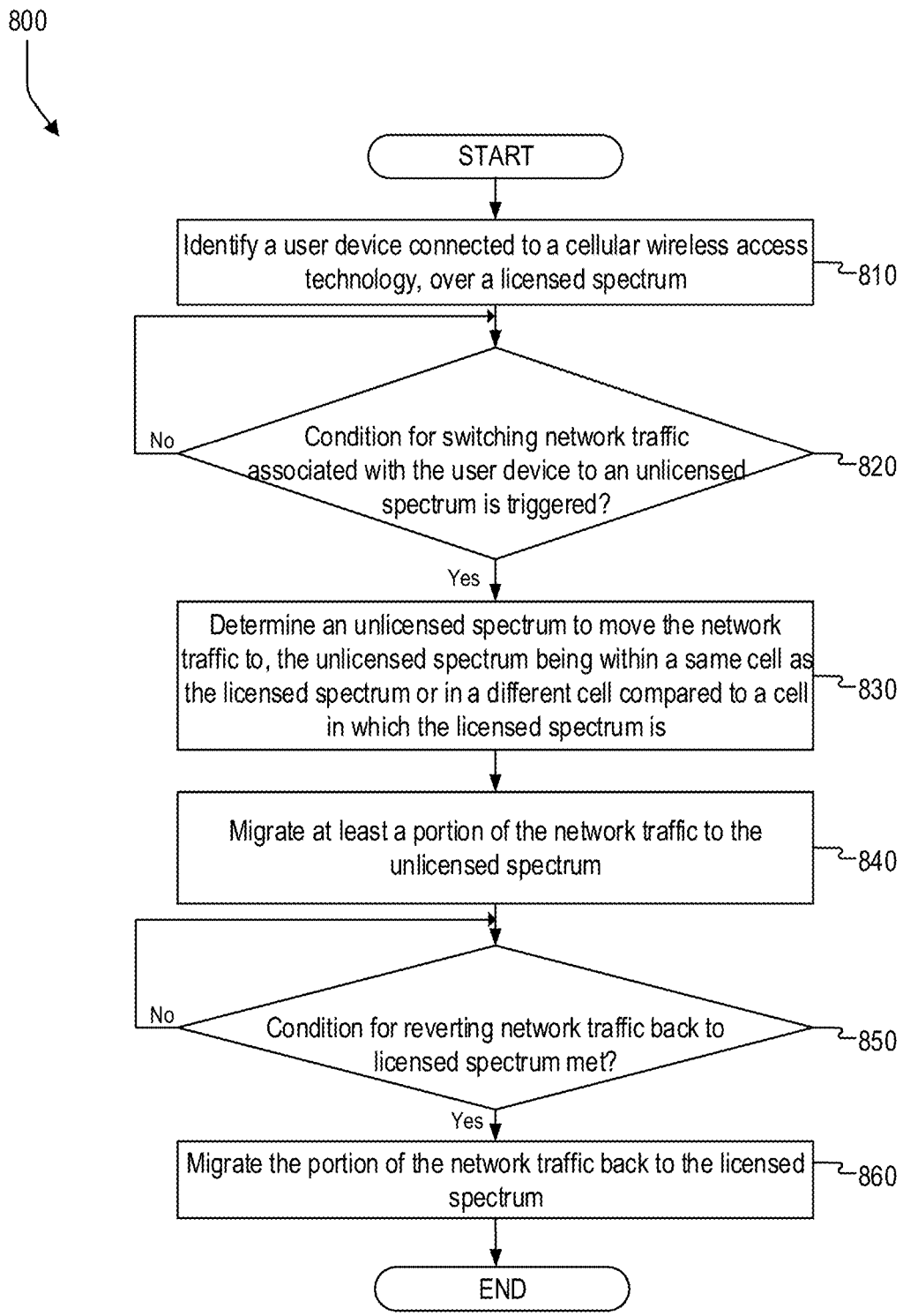
FIG. 8 illustrates a flow chart for an example method of migrating network traffic from a licensed spectrum to an unlicensed spectrum, according to some aspects of the present disclosure.

FIG. 8 illustrates a flow chart of a network traffic migration process/method 800 for migrating network traffic from a licensed spectrum to an unlicensed spectrum within the same RAT, according to some aspects of the present disclosure. Although the example method 800 depicts a particular sequence of operations, the sequence may be altered without departing from the scope of the present disclosure. For example, some of the operations depicted may be performed in parallel or in a different sequence that does not materially affect the function of the method 700. In other examples, different components of an example device or system that implements the method 800 may perform functions at substantially the same time or in a specific sequence. The process of FIG. 8 may be implemented by a network controller. Such network controller can be any one of fog nodes 162 (e.g., routers, controllers, cameras, access points, gateways), gNodeB (RAN) 220, an NF inside core network 230, AMF 306, SMF 332B, etc. It should be noted that such network controller may have one or more memories having computer-readable instructions stored therein and one or more associated processors configured to execute the computer-readable instructions to perform steps of method 800 as described below.

At step 810, method 800 includes identifying a user device connected to a cellular wireless access technology over a licensed spectrum. For example, an enhanced roaming system can identify UE 202 as illustrated in FIG. 2, which is connected to a cellular wireless access technology (e.g., via RAN 204 as illustrated in FIG. 2) over a licensed spectrum (e.g., 2.5 GHZ).

At step 820, method 800 includes determining whether a condition for switching network traffic associated with the user device to an unlicensed spectrum is triggered. The condition can be any one of the triggers described above with reference to FIGS. 4A-D, a threshold quota described with reference to FIG. 6, preconfigured triggers such as a schedule for moving traffic from a licensed spectrum to an unlicensed spectrum as described with reference to FIG. 7, etc. In one instance, method 800 includes receiving, from a network element, a usage report that includes a volume of the network traffic of the user device to compare to the capacity threshold of the licensed spectrum. For example, an enhanced roaming system can receive, from a network element of first cell 230A (e.g., SMF 232A, UPF 234A, PCF 236A, NRF 238A, etc.), a usage report that includes a volume of the network traffic of UE 202 to compare to the capacity threshold of first cell 230A in order to determine whether the network traffic of UE 202 should be moved to the unlicensed spectrum or not.

If at step 820, the network controller determines that the condition is not triggered (is not met), the network controller continues to steer network traffic associated with the user device (e.g., UE 202) over the licensed spectrum. However, if at step 820, the network controller determines that the condition for switching network traffic associated with the user is triggered, then at step 830, method 800 includes determining an unlicensed spectrum to move the network traffic to. The unlicensed spectrum can be within a same cell as the licensed spectrum (as described with reference to FIGS. 5-7) or can be in a different cell compared to a cell in which the licensed spectrum is (as described with reference to FIGS. 3 and 4A-4D).

At step 840, method 800 includes migrating at least a portion of the network traffic of the user device to the unlicensed spectrum in a similar manner as described above with reference to FIGS. 3-7. to the second cell on the unlicensed spectrum while maintaining network connectivity of the user device over the cellular wireless access technology. In one example, such migrating may occur by modifying a User Equipment Route Selection Policy (URSP) for the user device to migrate the portion of the network traffic to the unlicensed spectrum. In another example, such migrating may include transmitting a Radio Resource Control (RRC) connection reconfiguration message to the user device to migrate the portion of the network traffic to the unlicensed spectrum.

As described above with reference to FIGS. 6 and 7, network traffic that is moved to an unlicensed spectrum may be reverted back (migrated) back to the licensed spectrum. Accordingly, at step 850, method 8 includes determining whether a condition for reverting network traffic back to the licensed spectrum is triggered (met). If not, the network controller continues to steep the network traffic for the user device over the unlicensed spectrum until the condition for reverting back to the licensed spectrum is met. Once the reverting back condition is triggered, at step 860, the method 800 includes migrating the portion of the network traffic that was moved to the unlicensed spectrum at step 840, back to the licensed spectrum. In one example, such migrating may occur by modifying a User Equipment Route Selection Policy (URSP) for the user device to migrate the portion of the network traffic back to the licensed spectrum from the unlicensed spectrum. In another example, such migrating may include transmitting a Radio Resource Control (RRC) connection reconfiguration message to the user device to migrate the portion of the network traffic to the unlicensed spectrum.

With examples of network traffic steering between licensed and unlicensed spectrum within a 3GPP service described above with reference to FIGS. 1-8, as alternative methods of throttling, the disclosure now turns to example systems and components that can be utilized any of the network components described above with reference to FIGS. 1, 2, 3, and 5 including a network controller that may implement the process of FIG. 8.

Figure 9:
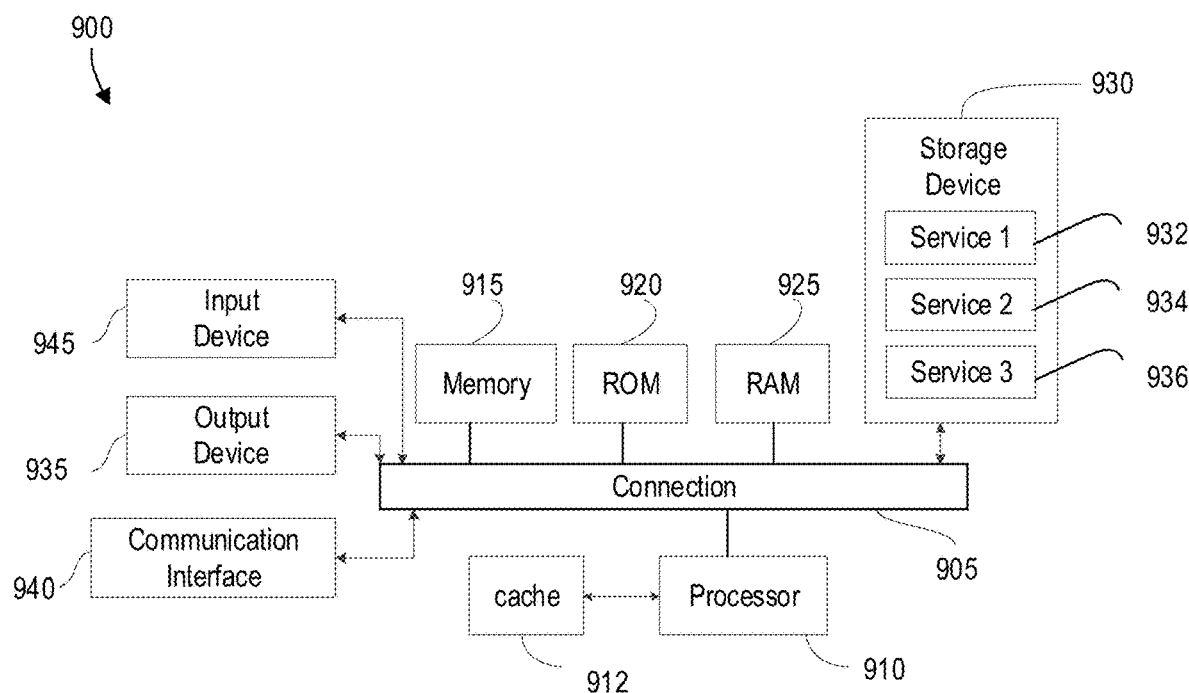
FIG. 9 shows an example computing system, which can be for example any computing device that can implement components of the system.

FIG. 9 illustrates an example computing system, according to some aspects of the present disclosure. FIG. 9 illustrates an example computing system 900 including components in electrical communication with each other using a connection 905 upon which one or more aspects of the present disclosure can be implemented. Connection 905 can be a physical connection via a bus, or a direct connection into processor 910, such as in a chipset architecture. Connection 905 can also be a virtual connection, networked connection, or logical connection.

In some embodiments computing system 900 is a distributed system in which the functions described in this disclosure can be distributed within a datacenter, multiple datacenters, a peer network, etc. In some embodiments, one or more of the described system components represents many such components each performing some or all of the function for which the component is described. In some embodiments, the components can be physical or virtual devices.

Example system 900 includes at least one processing unit (CPU or processor) 910 and connection 905 that couples various system components including system memory 915, such as read only memory (ROM) 920 and random access memory (RAM) 925 to processor 910. Computing system 900 can include a cache of high-speed memory 912 connected directly with, in close proximity to, or integrated as part of processor 910.

Processor 910 can include any general purpose processor and a hardware service or software service, such as services 932, 934, and 936 stored in storage device 930, configured to control processor 910 as well as a special-purpose processor where software instructions are incorporated into the actual processor design. Processor 910 may essentially be a completely self-contained computing system, containing multiple cores or processors, a bus, memory controller, cache, etc. A multi-core processor may be symmetric or asymmetric.

To enable user interaction, computing system 900 includes an input device 945, which can represent any number of input mechanisms, such as a microphone for speech, a touch-sensitive screen for gesture or graphical input, keyboard, mouse, motion input, speech, etc. Computing system 900 can also include output device 935, which can be one or more of a number of output mechanisms known to those of skill in the art. In some instances, multimodal systems can enable a user to provide multiple types of input/output to communicate with computing system 900. Computing system 900 can include communications interface 940, which can generally govern and manage the user input and system output. There is no restriction on operating on any particular hardware arrangement and therefore the basic features here may easily be substituted for improved hardware or firmware arrangements as they are developed.

Storage device 930 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read only memory (ROM), and/or some combination of these devices.

The storage device 930 can include software services, servers, services, etc., that when the code that defines such software is executed by the processor 910, it causes the system to perform a function. In some embodiments, a hardware service that performs a particular function can include the software component stored in a computer-readable medium in connection with the necessary hardware components, such as processor 910, connection 905, output device 935, etc., to carry out the function.

Figure 10:
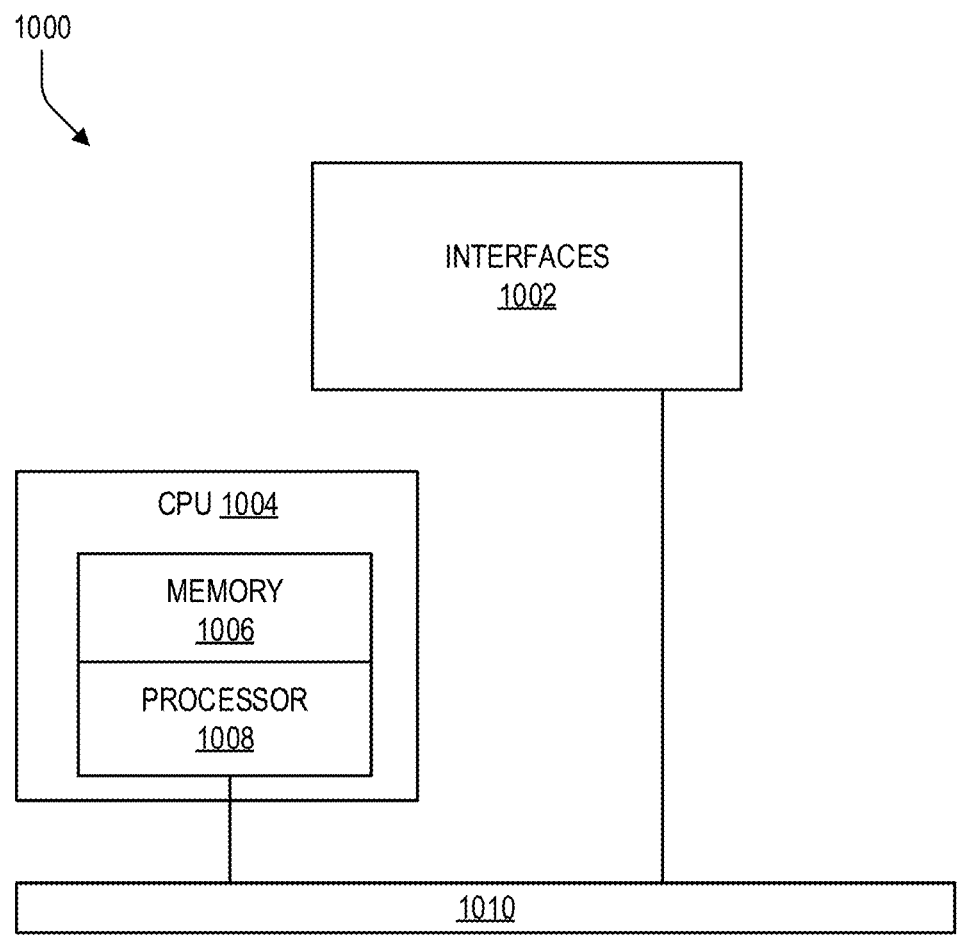
FIG. 10 illustrates an example network device, according to some aspects of the present disclosure.

FIG. 10 illustrates an example of a network device, according to some aspects of the present disclosure. FIG. 10 illustrates an example network device 1000 suitable for performing switching, routing, load balancing, and other networking operations. Network device 1000 includes a central processing unit (CPU) 1004, interfaces 1002, and a bus 1010 (e.g., a PCI bus). When acting under the control of appropriate software or firmware, the CPU 1004 is responsible for executing packet management, error detection, and/or routing functions. The CPU 1004 preferably accomplishes all these functions under the control of software including an operating system and any appropriate applications software. CPU 1004 may include one or more processors 1008, such as a processor from the INTEL X86 family of microprocessors. In some cases, processor 1008 can be specially designed hardware for controlling the operations of network device 1000. In some cases, a memory 1006 (e.g., non-volatile RAM, ROM, etc.) also forms part of CPU 1004. However, there are many different ways in which memory could be coupled to the system.

The interfaces 1002 are typically provided as modular interface cards (sometimes referred to as "line cards"). Generally, they control the sending and receiving of data packets over the network and sometimes support other peripherals used with the network device 1000. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces, WIFI interfaces, 3G/4G/5G cellular interfaces, CAN BUS, LoRA, and the like. Generally, these interfaces may include ports appropriate for communication with the appropriate media. In some cases, they may also include an independent processor and, in some instances, volatile RAM. The independent processors may control such communications intensive tasks as packet switching, media control, signal processing, crypto processing, and management. By providing separate processors for the communications intensive tasks, these interfaces allow the master CPU 1004 to efficiently perform routing computations, network diagnostics, security functions, etc.

Although the system shown in FIG. 10 is one specific network device of the present technology, it is by no means the only network device architecture on which the present technology can be implemented. For example, an architecture having a single processor that handles communications as well as routing computations, etc., is often used. Further, other types of interfaces and media could also be used with the network device 1000.

Regardless of the network device's configuration, it may employ one or more memories or memory modules (including memory 1006) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc. Memory 1006 could also hold various software containers and virtualized execution environments and data.

The network device 1000 can also include an application-specific integrated circuit (ASIC), which can be configured to perform routing and/or switching operations. The ASIC can communicate with other components in the network device 1000 via the bus 1010, to exchange data and signals and coordinate various types of operations by the network device 1000, such as routing, switching, and/or data storage operations, for example.

For clarity of explanation, in some instances the various embodiments may be presented as including individual functional blocks including functional blocks comprising devices, device components, steps or routines in a method embodied in software, or combinations of hardware and software.

In some embodiments the computer-readable storage devices, media, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Some examples of such form factors include general purpose computing devices such as servers, rack mount devices, desktop computers, laptop computers, and so on, or general purpose mobile computing devices, such as tablet computers, smart phones, personal digital assistants, wearable devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" refers to at least one of a set and indicates that one member of the set or multiple members of the set satisfy the claim. For example, claim language reciting "at least one of A and B" means A, B, or A and B.

What is claimed is:

1. A method comprising:
    identifying a user device connected to a cellular wireless access technology over an existing spectrum, the existing spectrum being one of a licensed spectrum or an unlicensed spectrum, the unlicensed spectrum being within a same cell or different cell as the licensed spectrum;
    receiving information from multiple control-plane network elements indicative of network utilization parameters for the user device over the existing spectrum;
    determining whether a condition for switching network traffic associated with the user device to an alternative spectrum is triggered based at least in part on the information received, the alternative spectrum being different than the existing spectrum;
    in response to determining that the condition is triggered, determining the alternative spectrum to move the network traffic to, wherein the alternative spectrum is the licensed spectrum if the existing spectrum is the unlicensed spectrum or the alternative spectrum is the unlicensed spectrum if the existing spectrum is the licensed spectrum; and
    migrating at least a portion of the network traffic to the alternative spectrum while maintaining network connectivity of the user device over the cellular wireless access technology.

2. The method of claim 1, wherein
    the condition includes a capacity threshold of the licensed spectrum, and
    the network traffic is migrated to the alternative spectrum if the capacity threshold of the existing spectrum is reached.

3. The method of claim 2, wherein the existing spectrum is the licensed spectrum and the alternative spectrum is the unlicensed spectrum.

4. The method of claim 2, wherein the utilization parameters include a volume of the network traffic of the user device to compare to the capacity threshold.

5. The method of claim 1, further comprising:
modifying a User Equipment Route Selection Policy (URSP) to migrate the portion of the network traffic to the alternative spectrum.

6. The method of claim 1, further comprising:
determining, after migrating the portion of the network traffic to the alternative spectrum, whether a second condition for switching the network traffic back to the existing spectrum is met; and
migrating the portion of the network traffic back to the existing spectrum from the alternative spectrum.

7. The method of claim 5, further comprising:
transmitting a Radio Resource Control (RRC) connection reconfiguration message to the user device to migrate the portion of the network traffic to the alternative spectrum.

8. A network controller comprising:
one or more memories having computer-readable instructions stored therein; and
one or more processors configured to execute the computer-readable instructions to:
identify a user device connected to a cellular wireless access technology over an existing spectrum, the existing spectrum being one of a licensed spectrum or an unlicensed spectrum, the unlicensed spectrum being within a same cell or different cell as the licensed spectrum;
receive information from multiple control-plane network elements indicative of network utilization parameters for the user device over the existing spectrum;
determine whether a condition for switching network traffic associated with the user device to an alternative spectrum is triggered based at least in part on the information received, the alternative spectrum being different than the existing spectrum;
in response to determining that the condition is triggered, determine the alternative spectrum to move the network traffic to, wherein the alternative spectrum is the licensed spectrum if the existing spectrum is the unlicensed spectrum or the alternative spectrum is the unlicensed spectrum if the existing spectrum is the licensed spectrum; and
migrate at least a portion of the network traffic to the alternative spectrum while maintaining network connectivity of the user device over the cellular wireless access technology.

9. The network controller of claim 8, wherein
the condition includes a capacity threshold of the licensed spectrum, and
the network traffic is migrated to the alternative spectrum if the capacity threshold of the existing spectrum is reached.

10. The network controller of claim 9, wherein the existing spectrum is the licensed spectrum and the alternative spectrum is the unlicensed spectrum.

11. The network controller of claim 9, wherein the utilization parameters include a volume of the network traffic of the user device to compare to the capacity threshold.

12. The network controller of claim 8, wherein the one or more processors are configured to execute the computer-readable instructions to modify a User Equipment Route Selection Policy (URSP) to migrate the portion of the network traffic to the alternative spectrum.

13. The network controller of claim 8, wherein the one or more processors are configured to execute the computer-readable instructions to:
determine, after migrating the portion of the network traffic to the alternative spectrum, whether a second condition for switching the network traffic back to the existing spectrum is met; and; and
the portion of the network traffic back to the existing spectrum from the alternative spectrum.

14. The network controller of claim 8, wherein the one or more processors are configured to execute the computer-readable instructions to transmit a Radio Resource Control (RRC) connection reconfiguration message to the user device to migrate the portion of the network traffic to the alternative spectrum.

15. One or more non-transitory computer-readable media comprising computer-readable instructions, which when executed by one or more processors of a network controller, cause the network controller to:
identify a user device connected to a cellular wireless access technology over an existing spectrum, the existing spectrum being one of a licensed spectrum or an unlicensed spectrum, the unlicensed spectrum being within a same cell or different cell as the licensed spectrum;
receive information from multiple control-plane network elements indicative of network utilization parameters for the user device over the existing spectrum;
determine whether a condition for switching network traffic associated with the user device to an alternative spectrum is triggered based at least in part on the information received, the alternative spectrum being different than the existing spectrum;
in response to determining that the condition is triggered, determine the alternative spectrum to move the network traffic to, wherein the alternative spectrum is the licensed spectrum if the existing spectrum is the unlicensed spectrum or the alternative spectrum is the unlicensed spectrum if the existing spectrum is the licensed spectrum; and
migrate at least a portion of the network traffic to the alternative spectrum while maintaining network connectivity of the user device over the cellular wireless access technology.

16. The one or more non-transitory computer-readable media of claim 15, wherein
the condition includes a capacity threshold of the licensed spectrum, and
the network traffic is migrated to the alternative spectrum if the capacity threshold of the existing spectrum is reached.

17. The one or more non-transitory computer-readable media of claim 16, wherein the utilization parameters include a volume of the network traffic of the user device to compare to the capacity threshold.

18. The one or more non-transitory computer-readable media of claim 15, wherein the execution of the computer-readable instructions by the one or more processors, further cause the network controller to modify a User Equipment Route Selection Policy (URSP) to migrate the portion of the network traffic to the alternative spectrum.

19. The one or more non-transitory computer-readable media of claim 15, wherein the execution of the computer-readable instructions by the one or more processors, further cause the network controller to:
determine, after migrating the portion of the network traffic to the alternative spectrum, whether a second condition for switching the network traffic back to the existing spectrum is met; and; and the portion of the network traffic back to the existing spectrum from the alternative spectrum.

20. The one or more non-transitory computer-readable media of claim 15, wherein the execution of the computer-readable instructions by the one or more processors, further cause the network controller to transmit a Radio Resource Control (RRC) connection reconfiguration message to the user device to migrate the portion of the network traffic to the alternative spectrum.

\* \* \* \* \*